US008855476B2

(12) United States Patent  
Liu et al.

(10) Patent No.: US 8,855,476 B2  
(45) Date of Patent: Oct. 7, 2014

(54) MEMS-BASED OPTICAL IMAGE STABILIZATION

(75) Inventors: Xiaolei Liu, Los Angeles, CA (US); Roman C. Gutierrez, Arcadia, CA (US); Pat K. Leang, Cerritos, CA (US); Jose A. Mendez, San Jose, CA (US); Corneliu Zaharia, Brasov (RO); Alexandru F. Drimbarean, Galway (IE); Petronel Gheorghe Bigioi, Arcadia, CA (US)

(73) Assignee: DigitalOptics Corporation MEMS, Arcadia, CA (US)

( * ) Notice: Subject to any disclaimer, the term of this patent is extended or adjusted under 35 U.S.C. 154(b) by 88 days.

(21) Appl. No.: 13/247,906

(22) Filed: Sep. 28, 2011

(65) Prior Publication Data

US 2013/0077945 A1      Mar. 28, 2013

(51) Int. Cl.
| | |
|---|---|
| G03B 17/00 | (2006.01) |
| G02B 27/64 | (2006.01) |
| H04N 5/232 | (2006.01) |
| G03B 5/00 | (2006.01) |
| G02B 26/08 | (2006.01) |

(52) U.S. Cl.
CPC ........ *G02B 27/64* (2013.01); *G03B 2205/0084* (2013.01); *G02B 27/646* (2013.01); *H04N 5/23248* (2013.01); *G03B 2205/0015* (2013.01); *G03B 5/00* (2013.01); *G02B 26/0841* (2013.01)
USPC ....................................... 396/55; 348/208.11

(58) Field of Classification Search
CPC .............. G03B 5/00; G03B 5/02; G03B 5/04; G03B 2217/00; G03B 2217/002; G03B 2217/005
USPC ....................................... 396/55; 348/208.11
See application file for complete search history.

(56) References Cited

U.S. PATENT DOCUMENTS

| 2,774,001 A | 12/1956 | Riedel |
| 4,333,722 A | 6/1982 | Lee |
| 4,384,778 A | 5/1983 | Lee et al. |
| 4,408,857 A | 10/1983 | Frank |
| 4,496,217 A | 1/1985 | Aoyagi |

(Continued)

FOREIGN PATENT DOCUMENTS

| EP | 1855145 | 11/2007 |
| EP | 1959284 | 8/2008 |

(Continued)

OTHER PUBLICATIONS

Tsuboi, O, et al., "A Rotational Comb-Driven Micromirror with a Large Deflection Angle and Low Drive Voltage," Technical Digest. MEMS. IEEE International Conference on Microelectro Mechanical Systems, Jan. 20, 2002, pp. 532-535.

(Continued)

*Primary Examiner* — Clayton E Laballe  
*Assistant Examiner* — Fang-Chi Chang  
(74) *Attorney, Agent, or Firm* — Haynes and Boone, LLP

(57) ABSTRACT

In one example, a camera is provided that includes: a plurality of MEMS electrostatic comb actuators, each actuator operable to exert a force on at least one lens; and an optical image stabilization (OIS) algorithm module operable to command the plurality of actuators to actuate the at least one lens responsive to motion of the camera.

19 Claims, 13 Drawing Sheets

(56) References Cited

U.S. PATENT DOCUMENTS

| | | |
|---|---|---|
| 4,716,432 A | 12/1987 | Stephany |
| 4,860,040 A | 8/1989 | Tamamura et al. |
| 5,150,260 A | 9/1992 | Chigira |
| 5,386,294 A | 1/1995 | Ototake et al. |
| 5,699,621 A | 12/1997 | Trumper et al. |
| 5,825,560 A | 10/1998 | Ogura et al. |
| 5,867,302 A | 2/1999 | Fleming |
| 5,986,826 A | 11/1999 | Kosaka et al. |
| 5,995,688 A | 11/1999 | Aksyuk et al. |
| 6,033,131 A | 3/2000 | Ghosh |
| 6,068,801 A | 5/2000 | Bodo et al. |
| 6,205,267 B1 | 3/2001 | Aksyuk et al. |
| 6,239,473 B1 | 5/2001 | Adams |
| 6,262,827 B1 | 7/2001 | Ueda et al. |
| 6,291,875 B1 | 9/2001 | Clark |
| 6,392,703 B1 | 5/2002 | Uchino et al. |
| 6,426,777 B1 | 7/2002 | Sato |
| 6,445,514 B1 * | 9/2002 | Ohnstein et al. .............. 359/813 |
| 6,493,631 B1 * | 12/2002 | Burns ........................... 701/472 |
| 6,497,141 B1 | 12/2002 | Turner et al. |
| 6,535,311 B1 | 3/2003 | Lindquist |
| 6,675,671 B1 | 1/2004 | Jokiel et al. |
| 6,679,055 B1 | 1/2004 | Ellis |
| 6,806,991 B1 | 10/2004 | Sarkar et al. |
| 6,847,907 B1 | 1/2005 | Novotny |
| 6,850,675 B1 | 2/2005 | Calvet et al. |
| 6,914,635 B2 | 7/2005 | Ostergard |
| 6,950,570 B1 | 9/2005 | Novotny |
| 6,958,777 B1 | 10/2005 | Pine |
| 7,027,206 B2 | 4/2006 | Mochizuki |
| 7,038,150 B1 | 5/2006 | Polosky et al. |
| 7,113,688 B2 | 9/2006 | Calvet et al. |
| 7,148,603 B1 | 12/2006 | Garcia |
| 7,154,199 B2 | 12/2006 | Yasuda |
| 7,190,854 B1 | 3/2007 | Novotny |
| 7,266,272 B1 | 9/2007 | Calvet et al. |
| 7,285,879 B2 | 10/2007 | Osaka |
| 7,359,131 B1 | 4/2008 | Gutierrez et al. |
| 7,372,074 B2 | 5/2008 | Milne et al. |
| 7,436,207 B2 | 10/2008 | Rogers et al. |
| 7,477,842 B2 | 1/2009 | Gutierrez |
| 7,545,591 B1 | 6/2009 | Tong et al. |
| 7,555,210 B2 | 6/2009 | Calvet |
| 7,557,470 B2 | 7/2009 | Culpepper et al. |
| 7,579,848 B2 | 8/2009 | Bottoms et al. |
| 7,586,702 B1 | 9/2009 | Huang et al. |
| 7,645,627 B2 | 1/2010 | Christenson |
| 7,646,969 B2 | 1/2010 | Calvet et al. |
| 7,705,909 B2 | 4/2010 | Ishizawa et al. |
| 7,720,366 B2 | 5/2010 | Iwasaki et al. |
| 7,838,322 B1 | 11/2010 | Vargo et al. |
| 7,855,489 B2 | 12/2010 | Hirano |
| 7,872,394 B1 | 1/2011 | Gritters et al. |
| 7,990,628 B1 | 8/2011 | Calvet et al. |
| 8,004,780 B2 | 8/2011 | Gutierrez et al. |
| 8,178,936 B2 | 5/2012 | Zhe et al. |
| 8,299,598 B2 | 10/2012 | Moden |
| 2001/0004420 A1 | 6/2001 | Kuwana et al. |
| 2002/0006687 A1 | 1/2002 | Lam |
| 2002/0064192 A1 * | 5/2002 | Missey et al. ................... 372/20 |
| 2002/0070634 A1 | 6/2002 | Tai et al. |
| 2002/0105699 A1 | 8/2002 | Miracky et al. |
| 2002/0125789 A1 | 9/2002 | Brandt |
| 2002/0130586 A1 | 9/2002 | Mao |
| 2003/0026547 A1 | 2/2003 | Trzecieski |
| 2003/0048036 A1 | 3/2003 | Lemkin |
| 2003/0062422 A1 | 4/2003 | Fateley et al. |
| 2003/0063838 A1 | 4/2003 | Hagood |
| 2003/0076421 A1 | 4/2003 | Dutta |
| 2003/0086751 A1 | 5/2003 | Culpepper |
| 2003/0210116 A1 | 11/2003 | Lane et al. |
| 2004/0017620 A1 | 1/2004 | Kaneko et al. |
| 2004/0048410 A1 | 3/2004 | O'Brien et al. |
| 2004/0066494 A1 | 4/2004 | Lee et al. |
| 2004/0136680 A1 | 7/2004 | Medina |
| 2004/0183936 A1 | 9/2004 | Kim et al. |
| 2004/0184132 A1 | 9/2004 | Novotny |
| 2004/0189969 A1 | 9/2004 | Mizuno |
| 2004/0201773 A1 | 10/2004 | Ostergard |
| 2005/0000311 A1 | 1/2005 | Storm |
| 2005/0002008 A1 | 1/2005 | De Weerdt et al. |
| 2005/0002086 A1 | 1/2005 | Starkweather et al. |
| 2005/0007489 A1 | 1/2005 | Ahn et al. |
| 2005/0095813 A1 | 5/2005 | Zhu et al. |
| 2005/0139542 A1 | 6/2005 | Dickensheets et al. |
| 2005/0148433 A1 | 7/2005 | Wang et al. |
| 2005/0156481 A1 * | 7/2005 | Zhou et al. ..................... 310/309 |
| 2005/0219399 A1 | 10/2005 | Sato et al. |
| 2005/0249487 A1 | 11/2005 | Gutierrez |
| 2006/0028320 A1 | 2/2006 | Osaka |
| 2006/0033938 A1 | 2/2006 | Kopf et al. |
| 2006/0056084 A1 | 3/2006 | Araki |
| 2006/0092514 A1 | 5/2006 | Koo et al. |
| 2006/0133786 A1 * | 6/2006 | Teramoto ........................ 396/55 |
| 2006/0153556 A1 | 7/2006 | Lee et al. |
| 2006/0183332 A1 | 8/2006 | Kang |
| 2006/0192858 A1 | 8/2006 | Calvet |
| 2006/0193618 A1 | 8/2006 | Calvet |
| 2006/0204242 A1 | 9/2006 | Gutierrez et al. |
| 2006/0209012 A1 | 9/2006 | Hagood, IV |
| 2006/0219006 A1 | 10/2006 | Nasiri et al. |
| 2006/0250325 A1 | 11/2006 | Hagood et al. |
| 2006/0252297 A1 | 11/2006 | Culpepper |
| 2006/0277997 A1 | 12/2006 | Foster |
| 2007/0024155 A1 | 2/2007 | Calvet |
| 2007/0133976 A1 | 6/2007 | Gutierrez |
| 2007/0263996 A1 * | 11/2007 | Iwasaki et al. .................. 396/55 |
| 2008/0020573 A1 | 1/2008 | Birkmeyer et al. |
| 2008/0044172 A1 | 2/2008 | Tang et al. |
| 2008/0054757 A1 | 3/2008 | Aksyuk |
| 2008/0152332 A1 * | 6/2008 | Koo et al. ........................ 396/55 |
| 2008/0198249 A1 * | 8/2008 | Tanimura et al. .............. 348/294 |
| 2008/0240704 A1 | 10/2008 | Takahashi |
| 2008/0279498 A1 | 11/2008 | Sampsell et al. |
| 2008/0309191 A1 | 12/2008 | Chou et al. |
| 2009/0031548 A1 | 2/2009 | Zaitsu |
| 2009/0185796 A1 | 7/2009 | Tsutsumi et al. |
| 2009/0213236 A1 | 8/2009 | Chiou et al. |
| 2009/0244302 A1 | 10/2009 | Tsai |
| 2009/0244668 A1 | 10/2009 | Fujino |
| 2009/0284816 A1 | 11/2009 | Davis et al. |
| 2009/0310959 A1 | 12/2009 | Shih et al. |
| 2010/0232777 A1 | 9/2010 | Tseng et al. |
| 2010/0284081 A1 | 11/2010 | Gutierrez |
| 2010/0302617 A1 * | 12/2010 | Zhou ............................. 359/291 |
| 2011/0026148 A1 | 2/2011 | Tanimura et al. |
| 2011/0234050 A1 * | 9/2011 | Oda ........................... 310/323.16 |
| 2012/0119614 A1 * | 5/2012 | Gutierrez ..................... 310/300 |

FOREIGN PATENT DOCUMENTS

| | | |
|---|---|---|
| EP | 2264507 | 12/2010 |
| JP | 2006-297543 | 11/2006 |
| JP | 2008-010624 | 1/2008 |
| JP | 2010-145264 | 7/2010 |
| JP | 2010-167536 | 8/2010 |
| KR | 2008/0079115 | 8/2008 |
| WO | WO02/063371 | 8/2002 |
| WO | WO2008/061025 | 5/2008 |
| WO | WO2010/038229 | 4/2010 |

OTHER PUBLICATIONS

Yi, Chu, et al., "Design, Fabrication and Control of Components in MEMS-Based Optical Pickups," IEEE Transactions on Magnetics, IEEE Service Center, New York, US, vol. 17, No. 2, Feb. 1, 2007, pp. 780-784.

Minching, Wu, et al., "Development of Tracking and Focusing Micro Actuators for Dual-Stage Optical Pick-Up Head," Journal of Optics. A, Pure and Applied Optics, Institute of Physics Publishing, Bristol, GB, vol. 8, No. 7, Jul. 1, 2006, pp. S323-S329.

(56) References Cited

OTHER PUBLICATIONS

Seong-Hyok Kim, et al., Integrated Micro Optical Flying Head with Lens Positioning Actuator for Small Form Factor Data Storage, Transducers '03. 12$^{th}$ International Conference on Solid-State Sensors, Actuators and Microsystems. Digest of Technical Papers (Cat. No. 03TH8664), vol. 1, Jan. 1, 2003, pp. 607-610.

Sunghoon, Kwon, et al., "Large Displacement Vertical Microlens Scanner wit Low Driving Voltage," IEEE Photonics Technology Letters, IEEE Service Center, Piscataway, NJ, US, vol. 14, No. 11, Nov. 1, 2002.

Takahashi, K., et al.; "Switched-Layer Design for SOI Bulk Micromachined XYZ Stage Using Stiction Bar for Interlayer Electrical Connection," Journal of Microelectromechanical Systems, IEEE Service Center, US, vol. 18, No. 4, pp. 818-827, Aug. 1, 2009.

Akihiro Koga et al. "Electrostatic Linear Microactuator Mechanism for Focusing a CCD Camera"; Journal of Lightwave Technology, vol. 17, No. 1: p. 43-47; Jan. 1999.

\* cited by examiner

MEMS-BASED OPTICAL IMAGE STABILIZATION

TECHNICAL FIELD

This disclosure relates, in general, to optical devices, and more particularly, to a MEMS-based image stabilization system.

BACKGROUND

The explosive growth of cell phone cameras with features such as zoom, auto focus, and high resolution has threatened to make the point-and-shoot digital camera obsolete. But as such miniature cameras migrate to ever higher megapixel density and zoom capabilities, the resulting image quality suffers from shaky human hands. Indeed, it is physically impossible for a human user to hold a camera still even when consciously trying in that human hands have a natural tremor that peaks in the range of 7 to 11 Hz. This roughly 10 Hz shaking of the camera will have more and more effect on the image quality depending upon the exposure time and also the angular field-of-view for each image pixel. The increase of pixel density in cell phone cameras introduces more and more image blur from camera jitter as a result.

Thus, MEMS-based motion sensors for digital cameras has been developed to address the image degradation that results from human hand tremor. For example, MEMS-based gyroscopes may be used to sense camera motion. In response to the sensed motion, an image stabilization system attempts to move the lens or the image sensor to minimize or eliminate the resulting motion-induced blurring of the image. However, the resulting actuation is performed using conventional actuators.

Accordingly, there is a need in the art for MEMS-based image stabilization systems.

SUMMARY

In accordance with a first aspect of the disclosure, a camera is provided that includes: a plurality of electrostatic actuators; and an optical image stabilization (OIS) algorithm module operable to command the plurality of actuators to actuate the at least one lens responsive to motion of the camera.

In accordance with a second aspect of the disclosure, a method of image stabilization is provided that includes: sensing a motion of a camera; based upon the sensed motion, determining a desired lens actuation that stabilizes a camera lens; translating the desired lens actuation into desired tangential actuations; and tangentially actuating the at least one lens using a plurality of tangential actuators according to the desired tangential actuations.

In accordance with a third aspect of the disclosure, a system is provided that includes: a lens; a stage holding the lens within a curved aperture; three tangential actuators symmetrically disposed about the stage, each tangential actuator operable to displace the stage in a direction tangential to a curve defined by the curved aperture; and an optical image stabilization (OIS) algorithm module operable to derive an actuation command for each of the three tangential actuators responsive to motion of the camera.

A better understanding of the above and many other features and advantages of the novel actuator devices of the present disclosure and the several methods of their use can be obtained from a consideration of the detailed description of some example embodiments thereof below, particularly if such consideration is made in conjunction with the appended drawings, wherein like reference numerals are used to identify like elements illustrated in one or more of the figures thereof.

DETAILED DESCRIPTION

Figure 1:
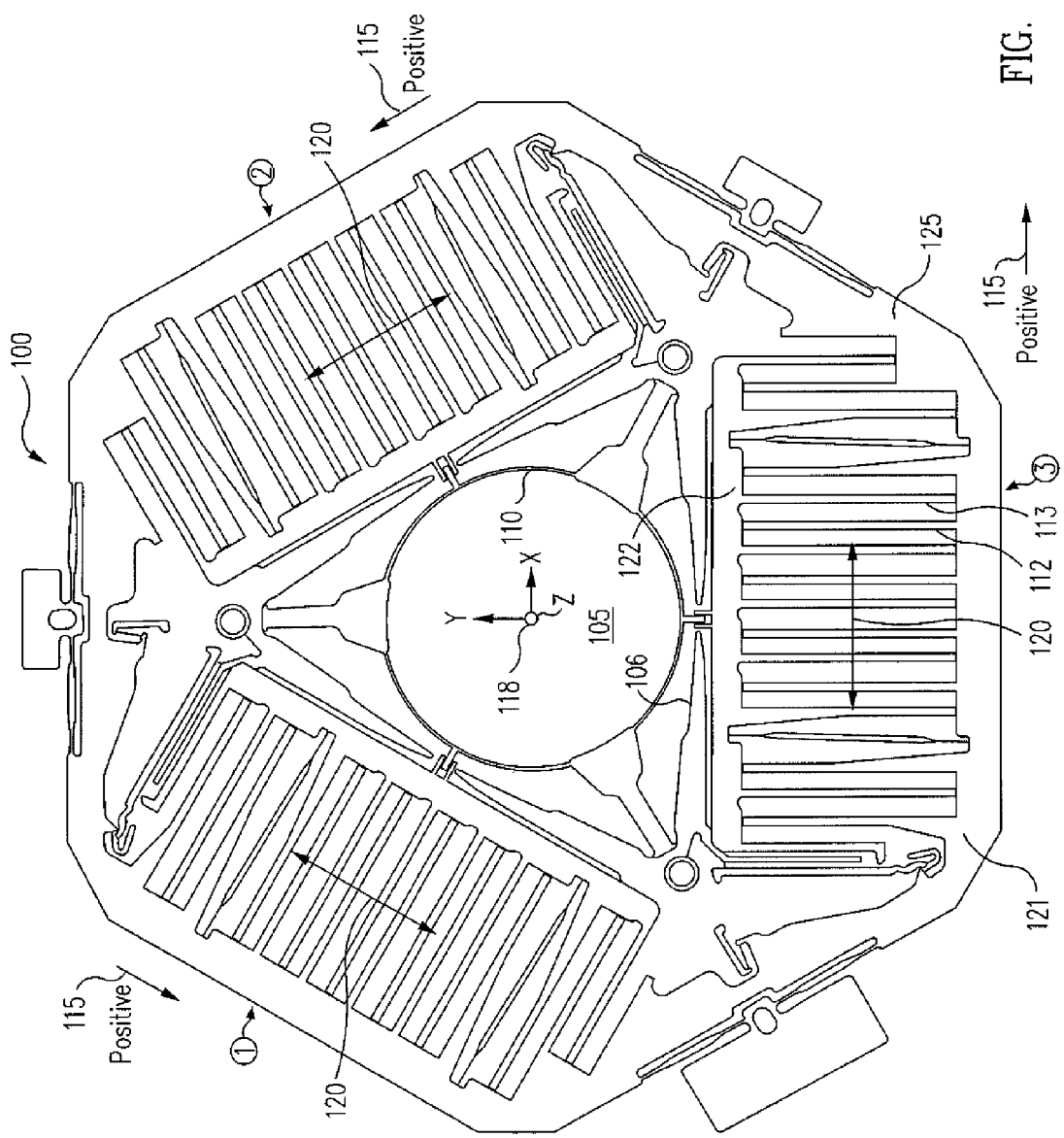
FIG. 1 is a plan view of an example image stabilization device that utilizes tangential actuation.

Electrostatic MEMS-based lens actuation is exploited to provide an efficient image stabilization system. In one embodiment, as few as three actuators may be disposed about an optical element such as a lens to effect image stabilization by exploiting tangential actuation. Turning now to the drawings, an image stabilization fixture 100 includes an a central aperture 105 defined by a circular mounting stage 110 for receiving an optical element such as a lens or group of lenses (not illustrated). Three actuators, designated as an actuator 1, an actuator 2, and an actuator 3, are symmetrically disposed about aperture 105. Each actuator actuates stage 110 in a tangential fashion. In other words, a linear displacement 120 introduced by each actuator defines a vector direction that is tangential to a circle enclosing an aperture center 118. For example, linear displacements 120 are tangential to the circle defined by mounting stage 110.

Figure 2A:
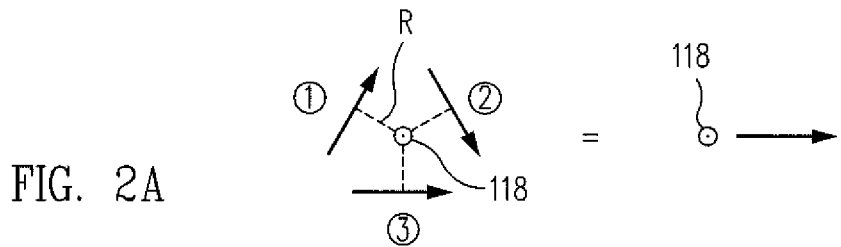
FIGS. 2A-2F are vector diagrams illustrating the use of the example image stabilization device of FIG. 1 to effect in-plane translational and rotational movement of an optical element.
Figure 2B:
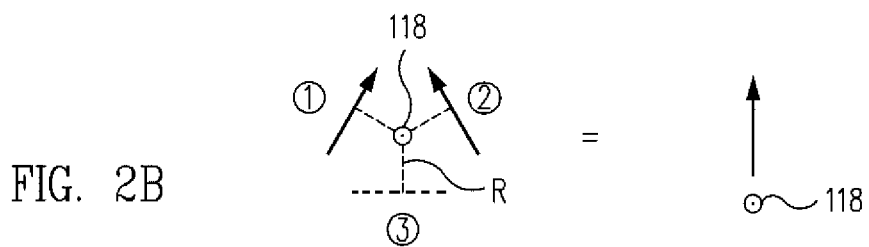
Figure 2C:
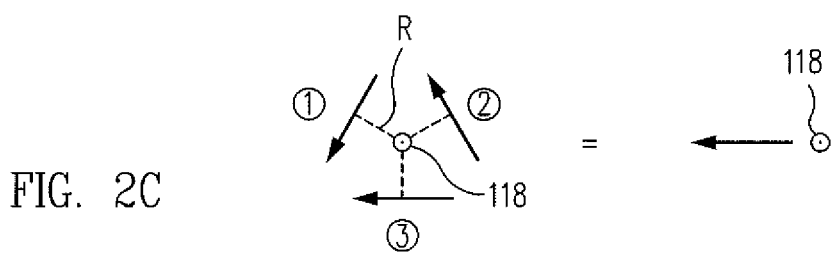
Figure 2D:
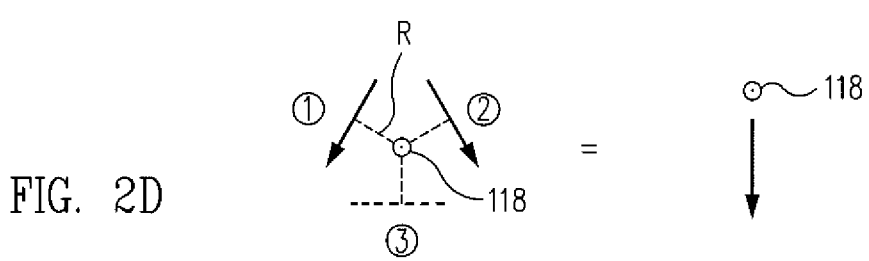

The resulting tangential actuation is better understood with regard to a Cartesian coordinate system defined at center 118 of aperture 105. Stage 110 and actuators 1, 2, and 3 lie in a plane defined by the x and y directions. A z direction projects normally from the plane at center 118. As used herein, a tangential displacement is said to be positive for each actuator as indicated by directions 115. Each actuator is thus capable of a positive and a negative displacement in that regard. As seen in FIG. 2A, if actuators 1, 2, and 3 each introduce an equal displacement, with actuators 1 and 2 being tangentially negative and actuator 3 being tangentially positive, the resulting tangential actuation of stage 110 is in the positive x direction. Conversely, if all the actuators 1 and 2 are positive while actuator 3 is equally negative, the resulting tangential actuation of stage 110 is in the negative x direction as shown in FIG. 2C. Alternatively, if actuator 3 is left neutral, actuator 1 actuates negatively a given amount, and actuator 2 actuates positively in the same amount, the net actuation of stage 110 is in the positive y direction as shown in FIG. 2B. Conversely, if actuator 3 is left neutral but the positive and negative displacements switched for actuators 1 and 2 switched as shown in FIG. 2D, the net actuation of stage 110 is in the negative y direction. In this fashion, tangential actuation can effect any desired amount of x and y displacement for stage 110 within the travel limits of the actuators.

Figure 2E:
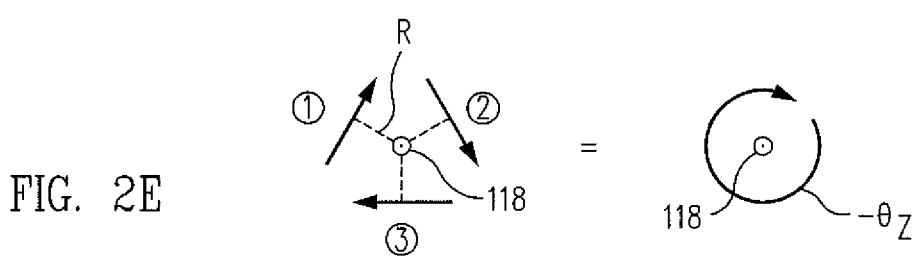
Figure 2F:
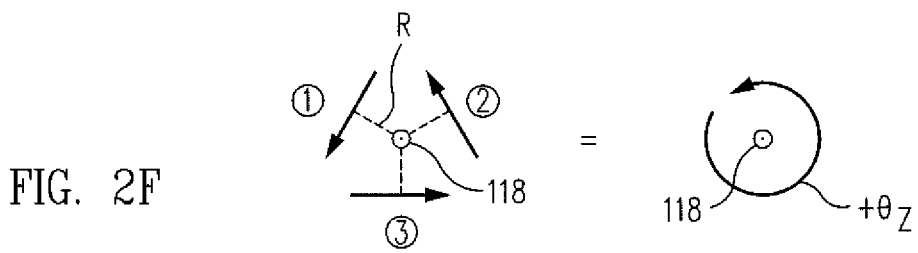

Tangential actuation can also introduce a rotation of stage 110 about the z axis. For example, if actuators 1, 2 and 3 each introduce an equal amount of negative displacements, the net actuation of stage 110 is a clockwise rotation (negative θ) in FIG. 2E. Conversely, if the actuations of FIG. 2E are all reversed as shown in FIG. 2Fm such that all tangential actuations are positive, the net actuation of stage 110 is a counter-clockwise z axis rotation (positive θ). In this fashion, stage 110 may be both translated as desired in the x and y plane as well as rotated in the θ direction.

The tangential displacement introduced by each actuator 1 through 3 may be represented in a local coordinate system. For example, the x-directed tangential displacement for actuator 3 may be designated as displacement in the $L_3$ direction with the same positive convention as represented by direction 115 of FIG. 1. Similarly, the tangential displacements for actuators 1 and 2 may be represented by local linear coordinates $L_1$ and $L_2$, respectively. The displacement in dimension $L_1$ from actuator 1, the displacement in $L_2$ from actuator 2, and the displacement in $L_3$ from actuator 3 may all be related to the translation in the x and y dimensions for stage 110 as well as a rotation in θ for stage 110 depending upon the radial distance R from center 118 to the effective tangential actuation point for each actuator. In that regard, it may be shown that a coordinate transformation is as follows:

$$L_1 = R\sin\theta - \frac{1}{2}X + \frac{\sqrt{3}}{2}Y$$

$$L_2 = R\sin\theta - \frac{1}{2}X + \frac{\sqrt{3}}{2}Y$$

$$L_3 = R\sin\theta + X$$

The above coordinate transformations assume that the lens neutral position is at the origin but may be modified accordingly if the neutral position is displaced from the origin. Using these coordinate transformations, a detected translation in the x, y plane or rotation of stage 110 resulting from jitter or other unintended physical disturbance of the camera may be addressed through a corresponding tangential actuation.

Any suitable actuator may be used to construct actuators 1, 2, and 3 such as a comb actuator or a gap-closing actuator. A biased comb actuator offers attractive travel characteristics such as +/−50 microns and may be implemented such as discussed in commonly-assigned U.S. application Ser. No. 12/946,670 (the '670 application), filed Nov. 15, 2010, the contents of which are incorporated by reference. In such an embodiment, each actuator has a fixed portion 121 and a moveable portion 122. In image stabilization device 100 of FIG. 1, fixed portion 121 integrates with an outer frame 125 and includes a plurality of fixed comb supports 112 that extend radially towards moveable portion 122. Similarly, moveable portion 122 includes a plurality of comb supports 113 that extend radially toward fixed portion 121. Comb supports 112 and 113 alternate with each other to support a plurality of combs 114. For illustration clarity, combs 114 are not shown in FIG. 1 but instead are shown in a closeup view in FIG. 4A through 4C.

Figure 3:
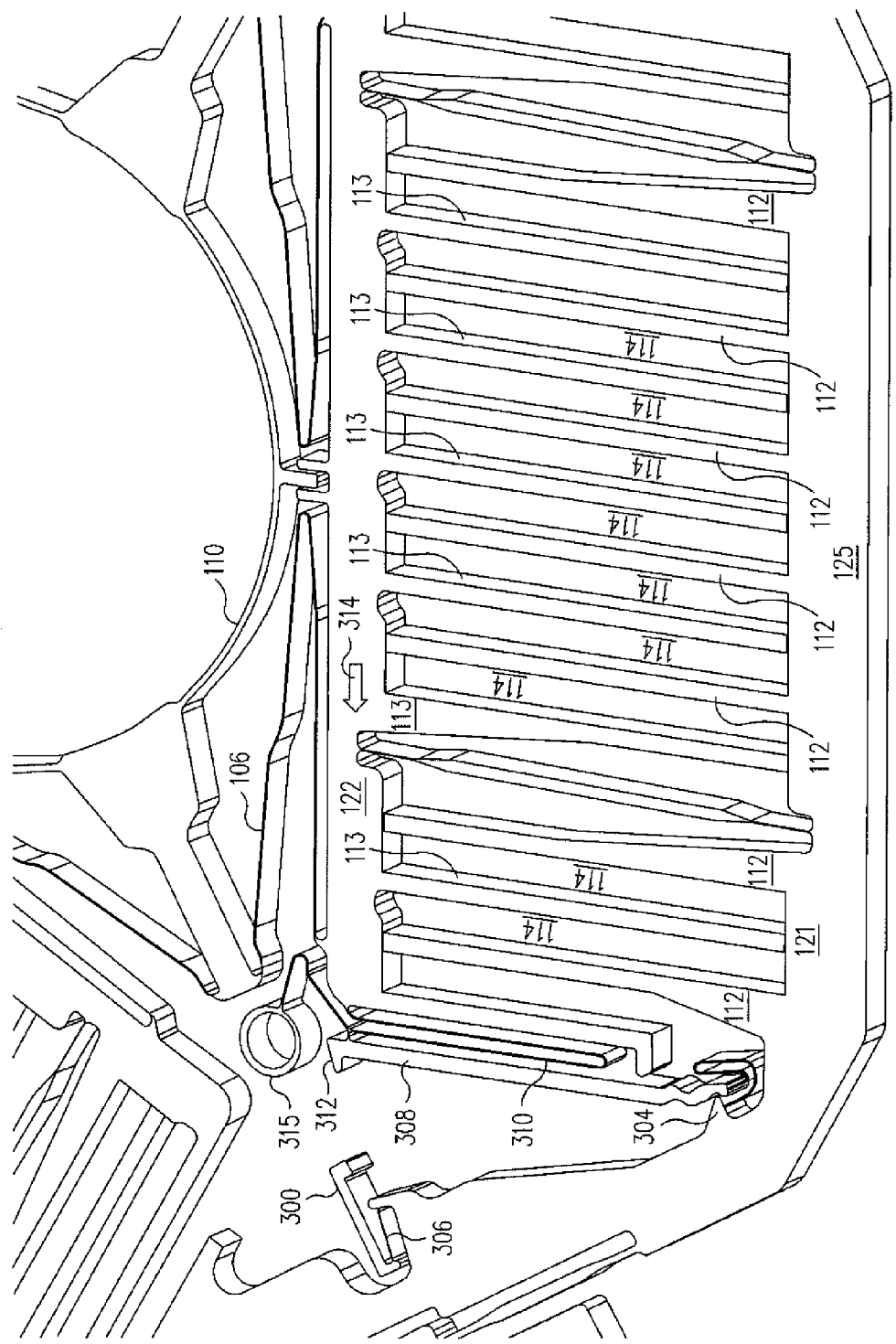
FIG. 3 is a perspective view of an actuator in the device of FIG. 1.

As seen in more detail in FIG. 3, each actuator 1 through 3 drives stage 110 through a corresponding flexure 106. To allow movement from opposing actuators, each flexure 106 may be relatively flexible in the radial direction while being relatively stiff in the tangential direction (corresponding to linear displacements 120 of FIG. 1). For example, flexure 106 may comprise a V-shaped folded flexure having a longitudinal axis aligned in the tangential direction. Such a V-shaped flexure permits a radial flexing yet is relatively stiff with regard to displacements 120. In this fashion, a "pseudo-kinematic" placement for stage 110 is achieved that precisely locates center 118 in a rest state yet achieves the desired x-y plane translation and θ rotation during image stabilization.

Manufacture of combs 114 using a MEMS process yet achieving a biased deployed state for actuators 1 through 3 may be accomplished using a linear deployment such as discussed in the '670 application. As seen in the closeup view of FIG. 4A, the interdigitated fingers making up each comb 114 may be manufactured in a fully interdigitated state. In other words, the fingers for comb 114 are initially disposed such that the associated fixed and moveable comb supports 112 and 113 are spaced apart by approximately the length of the fingers in comb 114. Accordingly, the application of a voltage differential across comb 114 in the un-deployed state of FIG. 4A would not result in any in-plane rectilinear movement of stage 110 relative to frame 125, and hence, any corresponding X, Y or θ movement of a lens coupled to the former. To allow room for actuation, each comb 114 should be spread apart and deployed as shown in FIG. 4B

Figure 4:
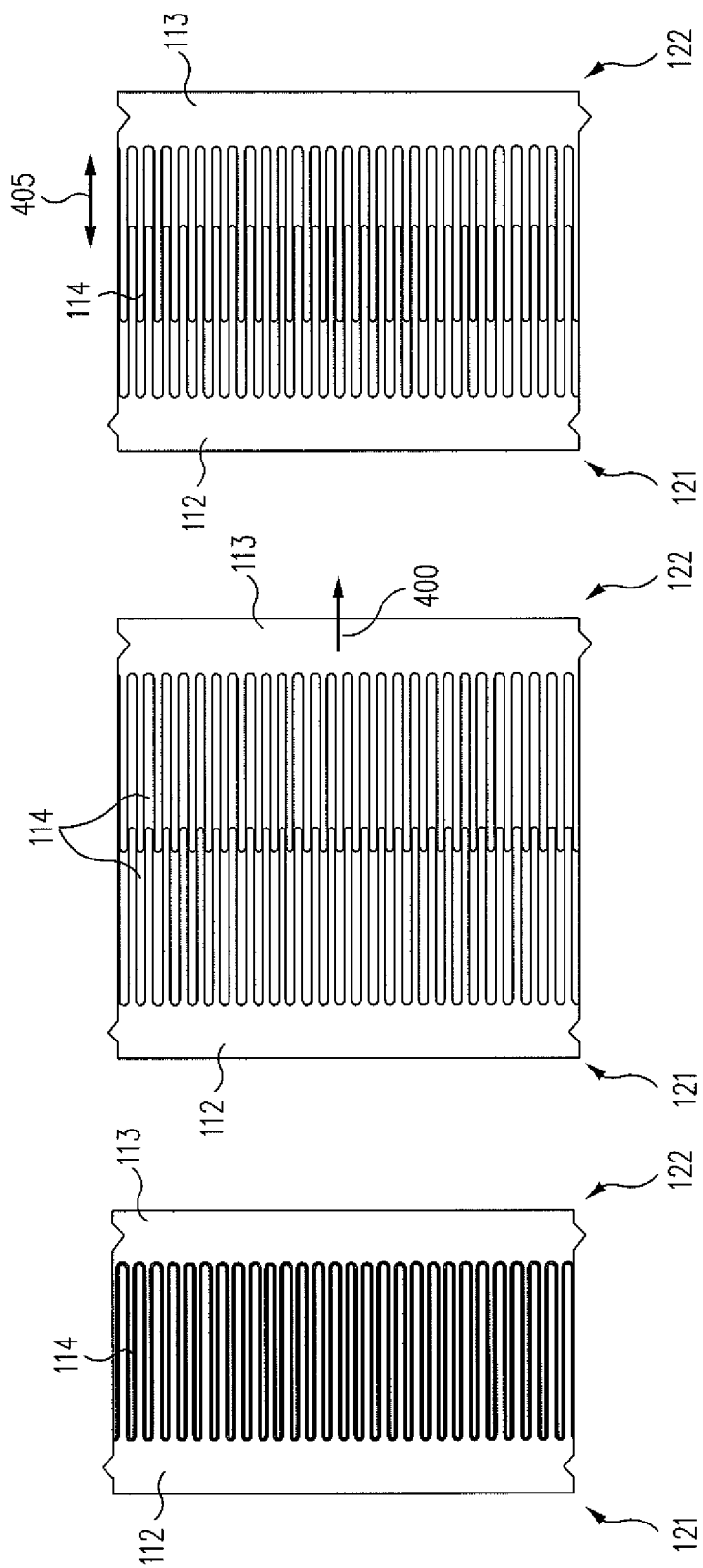
FIG. 4A is a partial plan view of the interdigitated fingers for a comb in the actuator of FIG. 3, showing the fingers before the actuator is deployed for operational use.
FIG. 4B is a partial plan view of the interdigitated fingers for a comb in the actuator of FIG. 3, showing the fingers after the actuator has been deployed.
FIG. 4C is a partial plan view of the interdigitated fingers for a comb in the actuator of FIG. 3, after the comb has been biased to an operating position.

As illustrated in FIG. 4B, in one embodiment, this deployment can be effected by moving the comb support 113 (and hence, movable portion 122 of FIG. 1) in the direction of an arrow 400 to a deployed position that is coplanar with, parallel to and spaced at a selected distance apart from the associated fixed comb support 112, and then fixing moveable portion 122 in the deployed position for substantially coplanar, rectilinear movement with regard to fixed portion 121. As illustrated in FIG. 4C, when thus deployed, the application and removal of a suitable voltage differential across comb 114 will result in a substantially rectilinear and coplanar movement of the resiliently supported moveable portion 122 toward and away from fixed portion 121 as indicated by a double-headed arrow 402, and hence, a corresponding X, Y and/or θZ movement of an element coupled to stage 110.

There are several different methods and apparatus for deploying moveable portion 122 to the deployed position as well as for locking or fixing it in the deployed position. For example, as seen in FIG. 3 a deployment method involves a coplanar over-center latch 300 and a fulcrum 304 on frame 125. Latch 300 is coupled to frame 125 with a latch flexure 306. A coplanar deployment lever 308 is coupled to moveable portion 122 through a deployment flexure 310. Deployment lever 308 has a cam surface 312 that is configured to engage with latch 300. In addition, lever 308 has a notch for engaging with fulcrum 304 for rotational movement of the lever with regard to fulcrum 304.

Figure 5:
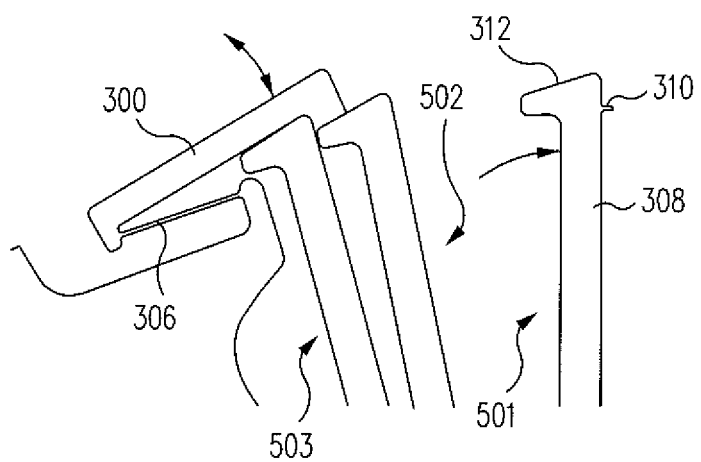
FIG. 5 is a plan view of an actuator latch of FIG. 3, showing various stages in its engagement with the actuator lever.

In an example deployment, an acceleration pulse is applied to moveable portion 122 in the direction of an arrow 314 while holding the frame 125 static as shown in FIG. 3. This pulse causes deployment lever 308 to rotate about fulcrum 304 towards latch 300. The rotation of the deployment lever 308 about the fulcrum 304 causes cam surface 312 to engage latch 300 as seen in FIG. 5. Initially, lever 308 is in an un-deployed position 501 but begins to rotate into intermediate position 502 such that cam surface 312 biases latch 300 and stretches latch flexure 306. Deployment flexure 310 is shown mostly cutaway for illustration clarity. Continued rotation of lever 308 allows latch flexure 306 to pull latch 300 back down to latch lever 308 into a latched position 503. To produce the acceleration pulse that rotates lever 308 and displaces moveable portion 122, a small needle or another MEMS device may be inserted into a pull ring 315 (FIG. 3) and actuated accordingly. In an alternative embodiment, moveable portion 122 may be deployed using capillary action such as described in commonly-assigned U.S. application Ser. No. 12/946,657, filed Nov. 15, 2010, the contents of which are incorporated by reference. Similarly, alternative deployment and latching structures and methods are described in the '670 application.

The deployment and latching may result in combs 114 being relatively fully opened as shown in FIG. 4B. In such a position, combs 114 can effectively only be contracted as opposed to being expanded. In that regard, both a contraction and an expansion is desirable to get both positive and negative tangential movements as discussed above with regard to actuators 1, 2, and 3. A default state during image stabilization may thus involve some degree of voltage being applied across combs 114 to achieve the intermediate interdigitation as shown in FIG. 4C. In this fashion, should the comb voltage be lowered below the default operating voltage level of FIG. 4C, comb 114 will expand. Conversely, should the comb voltage be increased with regard to the default operating level, comb 114 will contract. In this manner, both positive and negative actuation may be applied by actuators 1, 2, and 3 as indicated by arrow 405.

Figure 6:
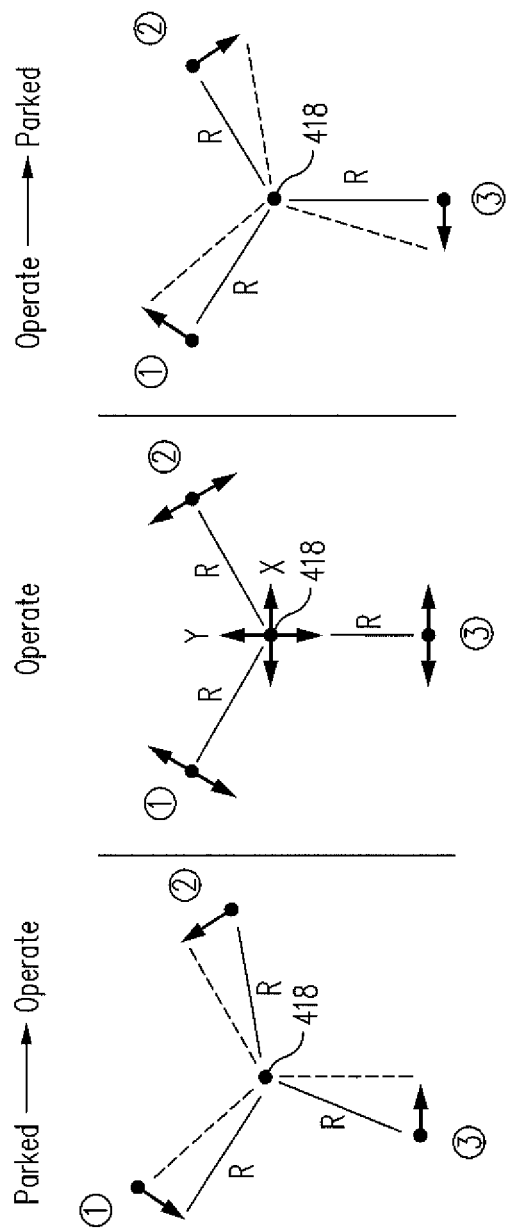
FIGS. 6A-6C are vector diagrams illustrating in-plane rotational movement of a stage of the device of FIG. 1 between a "parked" state and an "operating" state.

Prior to application of the default voltage across combs 114, the actuators may be in a "beginning-of travel," "power-off" or "parked" state. In the parked state, image stabilization in inoperative but center 118 is unaffected. As discussed with regard to FIG. 2F, an appropriate displacement for each of actuators 1, 2, and 3 produces a positive rotation in theta but no x-y plane translation. Such a displacement at each comb 114 is thus sufficient to go from the deployed but inactive state shown in FIG. 4b to the default operating state of FIG. 4C. FIG. 6A shows the rotation from actuators 1, 2, and 3 to go from the parked state to the active optical image stabilization state. As illustrated in FIG. 6B, after combs 114 have been biased to their operating voltages, selectively applying controlled increases or decreases in the respective operating voltages for each of the actuators 1, 2, and 3 will result in a deterministic movement of stage 110 (and hence center 118) as discussed above in connection with FIGS. 2A-2F. To save on power when imaging is not being performed, actuators 1, 2, and 3 may again be parked into their inactive states as shown in FIG. 6C. Additional features for actuators 1, 2, and 3 are described in concurrently filed U.S. application Ser. No. 13/247,895entitled Optical Image Stabilization Using Tangentially Actuated MEMS Devices, the contents of which are incorporated by reference in their entirety.

Figure 7:
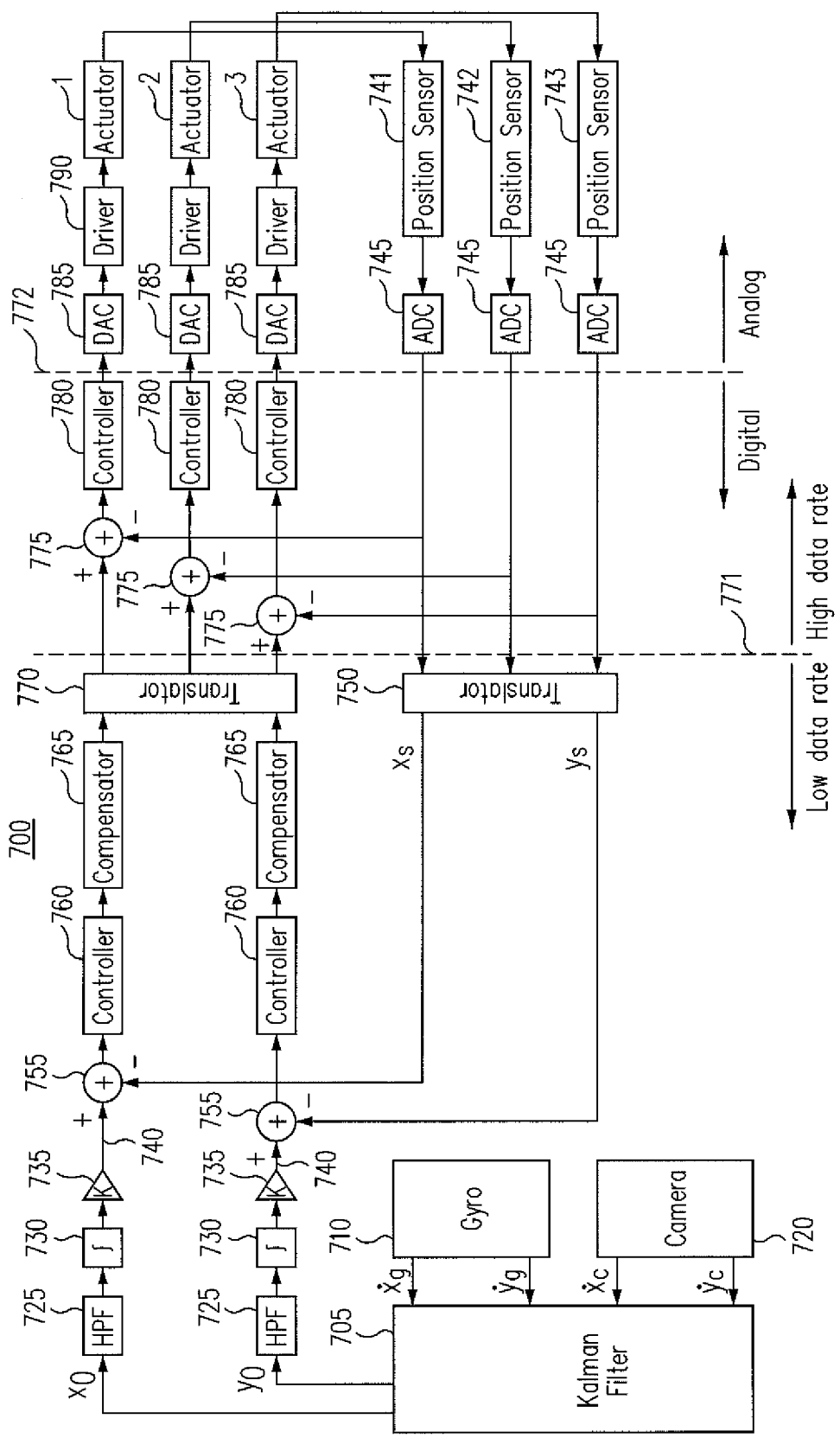
FIG. 7 is a block diagram of an image stabilization system using tangential actuators.

A block diagram for a control system 700 to control image stabilization using tangential actuation is shown in FIG. 7. In image stabilization, it is conventional to distinguish between intended motion of the camera as opposed to unintended jitter. For example, a user may be deliberately moving a camera through a 90 degree range of motion to image different subjects. Should this deliberate movement not be detected, the image stabilization system would have the impossible and undesirable task of rotating the lens 90 degrees to compensate for such intended motion. One way to distinguish unintended jitter of the camera is to use employ a tracking loop that predicts the intended motion of a camera. In one embodiment, control system 700 includes a tracking filter such a Kalman filter 705 that predicts a current lens position based upon previously-measured camera movement.

Kalman filter 705 needs some measure of camera motion to make a prediction of what is intended movement of the camera as opposed to unintended jitter. Thus, an inertial sensor such as a MEMS-based gyroscope 710 measures the velocity of some reference point on the camera such as aperture center 118 discussed previously. The x, y plane velocities for center 118 as obtained from pitch and yaw measurements from gyroscope 710 may be designated as $x_g$ and $y_g$, respectively. Such inertial measurements may be supplemented by motion estimates obtained from analyzing the camera image. Thus, a camera image processor 720 may also make an estimate for the x, y plane velocities for center 118, which may be designated as $x_c$ and $y_c$, respectively. The Kalman filter receives the velocity estimates from gyroscope 710 and camera image processor 720 to filter them so as to make a prediction of the x, y plane velocity for lens center 118 accordingly. This Kalman filter predication for the reference location velocities in the x, y plane may be designated as $x_0$ and $y_0$, respectively. The velocity estimates are filtered through high pass filters 725 to remove gyroscope drift and integrated in integrators 730 and multiplied by an appropriate scale factor in amplifiers 735 to obtain position estimates 740. In that regard, estimates 740 represent what Kalman filter 705 predicts as the intended position of lens center 118 without the presence of jitter. Any difference between estimates 740 and the actual lens position is treated as jitter and should be compensated for by image stabilization control system 700. It will be appreciated that embodiments of control system 700 may be implemented that do not include such a predicted tracking loop. For example, the inertial measurements from gyroscope 710 may be merely high-pass filtered to provide a cruder estimate of the intended camera velocities. Such velocity estimates may be integrated as discussed above to obtain position estimates 740.

To obtain the actual lens position (or equivalently, the position of some reference point such as center 118), each actuator is associated with a position sensor. For example, actuator 1 may be associated with a position sensor 741 that senses the $L_1$ displacement discussed earlier. In that regard, position sensor 741 may sense the capacitance across combs 114 to make an estimate of the $L_1$ displacement. Alternatively, other type of position sensors may be used such as Hall sensors. Similarly, actuators 2 and 3 are associated with corresponding position sensors 742 and 743. Position sensor 742 thus senses the $L_2$ displacement whereas sensor 743 senses the $L_3$ displacement. These sensed displacements may then be digitized in corresponding analog-to-digital converters 745 and presented to a coordinate translator 750. The tangential actuations $L_1$ through $L_3$ may be converted into a sensed position $x_s$, $y_s$ by inverting the equations discussed previously with θ equaling zero. The difference between the sensed position and the Kalman-filter-predicated position is then determined using adders 755. The outputs from adders 755 may then be filtered in controllers 760 and compensators 765 to get the resulting x and y coordinates of where the lens should be actuated to compensate for the jitter of the camera.

A translator 770 translates the x and y coordinates into tangential coordinates $L_1$, $L_2$, and $L_3$ as described in the equation above with θ equaling zero. The outputs from translator 770 thus represents the desired actuation of actuators 1 through 3. The Kalman filter prediction and generation of the resulting desired actuation takes place at a relatively slow data rate in that significant calculation is necessary. But the actual actuation to drive actuators 1 through 3 to the desired degree of actuation may take place at a relatively high data rate. Thus, a demarcation 771 in FIG. 7 indicates the partition of a digital domain for control system 700 into relatively high and relatively low data rates. Similarly, a demarcation 772 indicates the partition of control system 700 into digital and analog domains.

The difference between the desired degree of actuation and the actual actuation of actuators 1, 2, and 3 may be determined using corresponding adders. A corresponding controller 780 then determines an appropriate control signal for its actuator accordingly. The resulting digital control signals may then be converted into analog control signals using digital to analog converters (DACs) 790. As known in the art, an electrostatic comb actuator typically requires boosted voltage levels such as obtained through charge pumps. Thus, each actuator 1 through 3 is driven by a corresponding driver circuit 790 responsive to the analog control signals produced in DACs 790. In this fashion, control system 700 can uses gyroscope 710 that is sensing camera motion in the Cartesian x, y plane to advantageously achieve image stabilization using just three tangential MEMS actuators.

Figure 8:
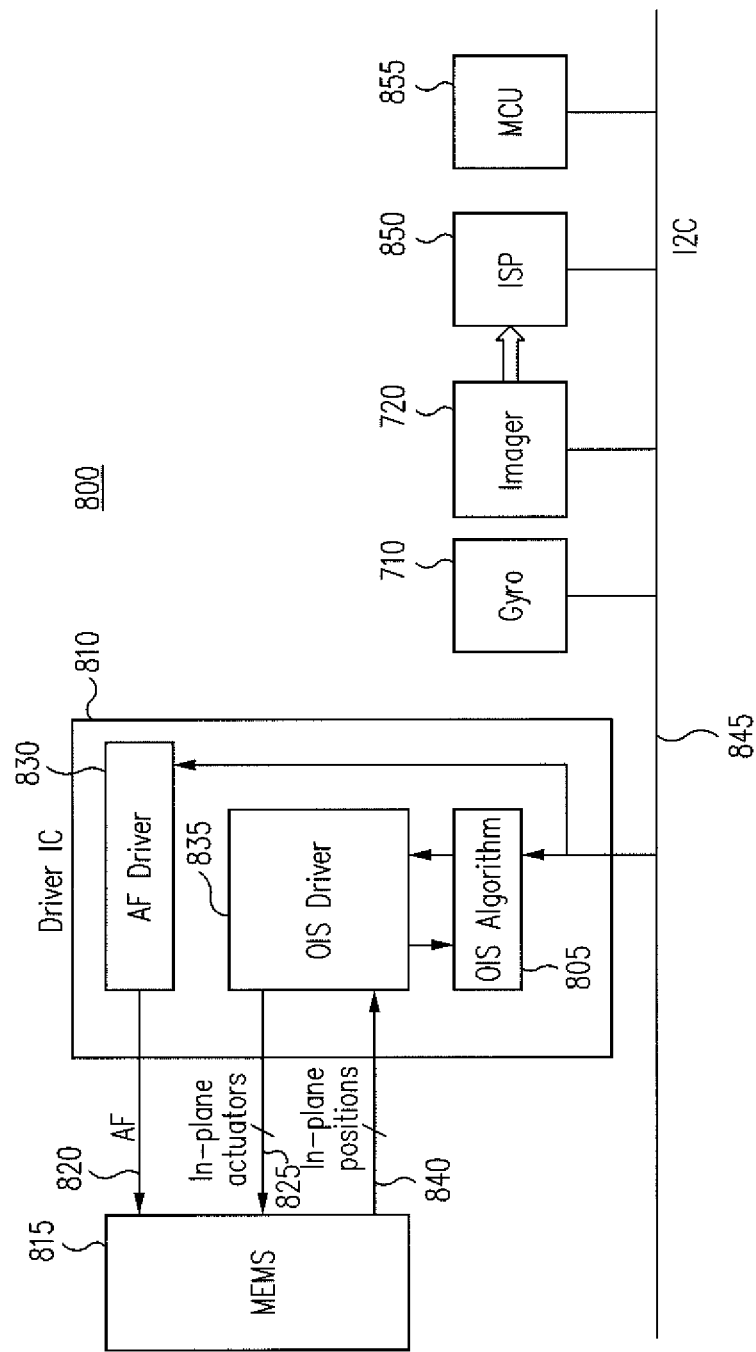
FIG. 8 is a block diagram of an embodiment of the system of FIG. 7 in which the optical image stabilization algorithm is implemented in a driver integrated circuit.

Image stabilization using system 700 may be implemented using a number of alternative embodiments. In that regard, the aggregation of digital components and signal paths from Kalman filter 705 through translators 770 and 750 may be designated as an OIS algorithm module. The OIS algorithm module may be implemented in various integrated circuit architectures. As shown in FIG. 8, one embodiment of a camera 800 includes an OIS algorithm module 805 within a MEMS driver integrated circuit (IC) 810. Camera 800 includes MEMS tangential actuators for image stabilization as discussed above as well as actuators for autofocus (AF) purposes and zooming purposes. These MEMS actuators are shown collectively as a MEMS module 815. Driver IC 810 drives MEMS module 815 with AF commands 820 from an AF driver 830 as well as in-plane tangential actuation commands 825 from an optical image stabilization (OIS) driver 835. MEMS module 815 includes positions sensors such as discussed with regard to FIG. 7 so that driver IC 810 may receive in-plane tangential actuator positions 840.

Figure 9:
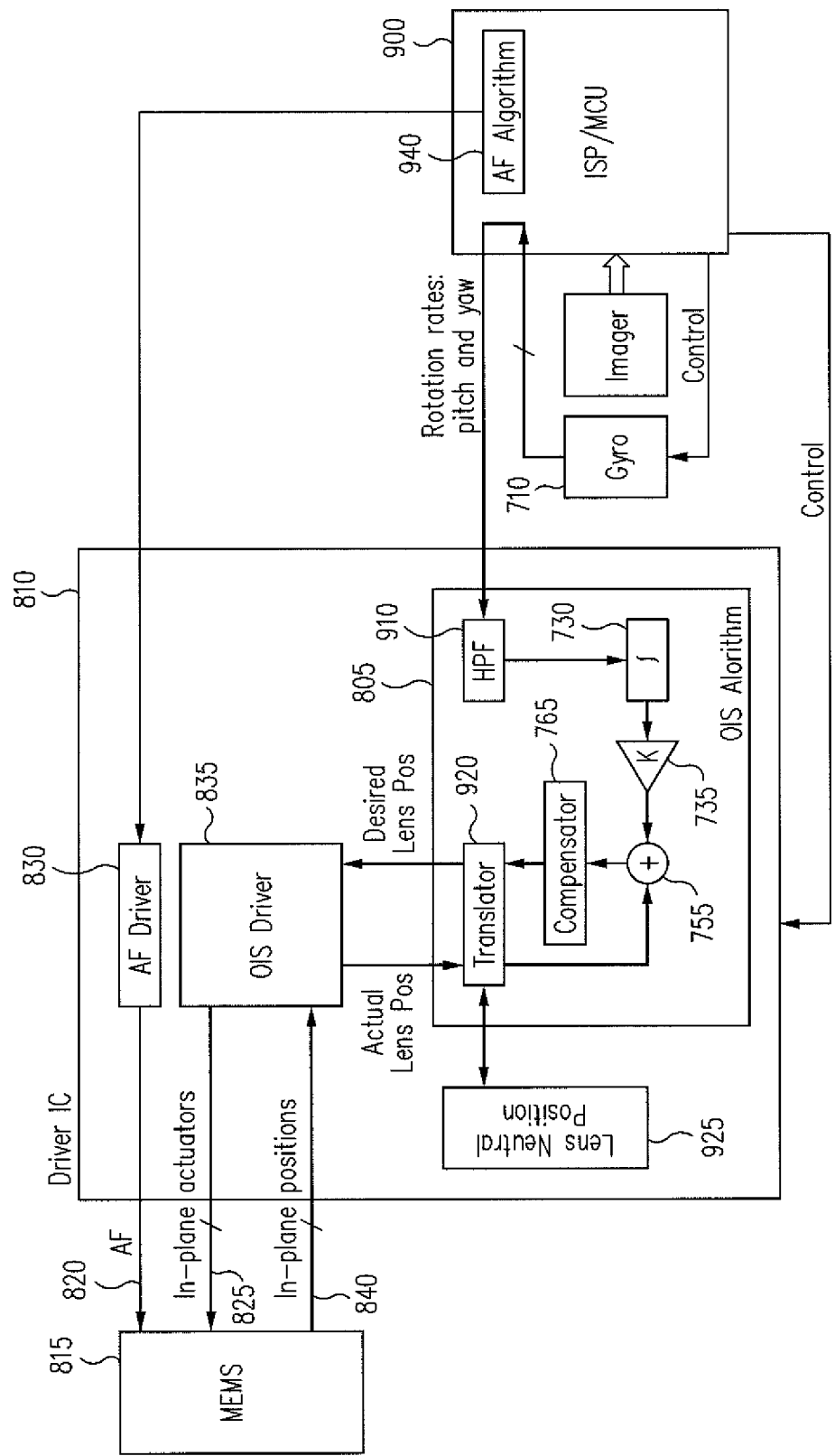
FIG. 9 illustrates more details for the driver integrated circuit of FIG. 8.

A bus such as an I²C bus 845 couples driver IC 810 to other camera components. However, it will be appreciated that other bus protocols may be utilized. In camera 800, gyroscope 710, imager 720, an image processor 850, and a micro controller unit (MCU) 855 all couple to I²C bus 845. Since the I²C protocol is a master-slave protocol, the location of module 805 in driver IC 810 provides lower latency as will be described further herein. FIG. 9 shows the resulting control loops for camera 800. The bus master may be either the ISP or the MCU as represented by master module 900. OIS algorithm module 805 is a simplified version in that the tracking filter is omitted and the intended motion of the camera approximated by high pass filtering 910 the pitch and yaw rates from gyroscope 710. Because the data flow on a master-slave bus is always from slave-to-master or from master-to-slave, the rotation rates from gyroscope 710 first flow to master module 900 and then to driver IC 810. Master module 900 controls both gyroscope 710 and driver IC 810 in that regard. For illustration clarity, just a single combined channel is shown for OIS algorithm module 805. Thus, a translator 920 represents translators 770 and 750 of FIG. 7. The actual and desired lens positions are translated within translator 920 with respect to a lens neutral position 925.

Figure 10:
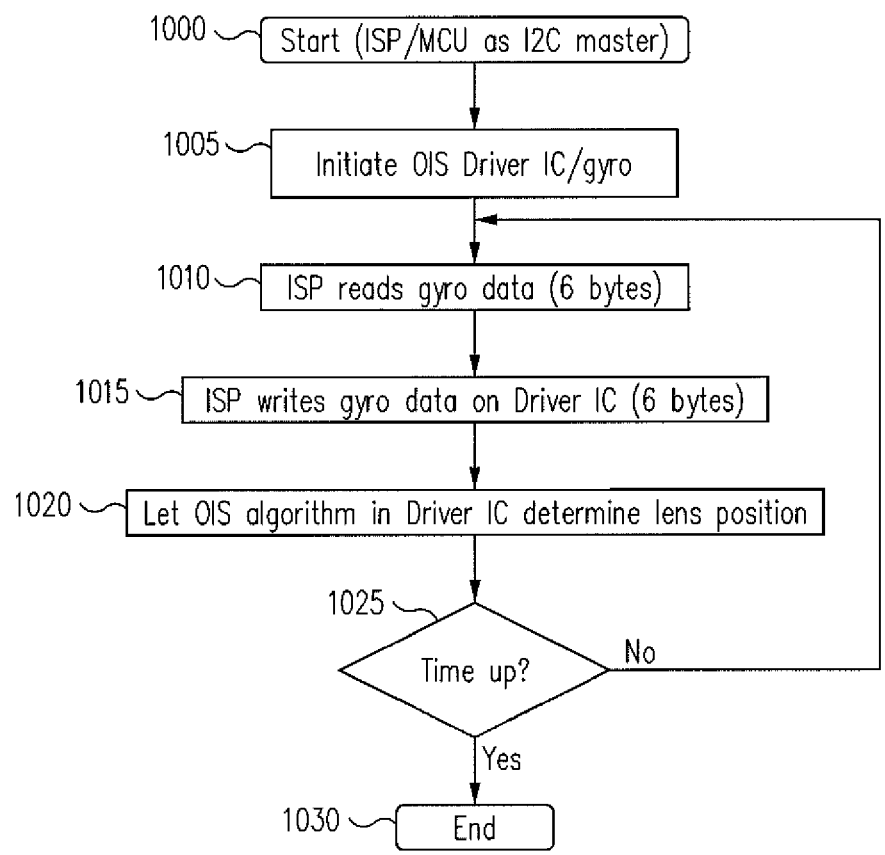
FIG. 10 is a flowchart for the image stabilization process performed by the system of FIGS. 8 and 9.

The resulting data traffic on bus 845 is shown in FIG. 10. Image stabilization necessarily draws some current and thus it is desirable to only commence image stabilization while a user is taking a digital photograph. At that time, the OIS data traffic begins in an initial step 1000 with master module 900 as the I²C bus master. At that time, gyroscope 710 may begin taking inertial measurements of camera movement and OIS driver 835 may command MEMS actuators 815 to transition from a parked to an active state as represented by step 1005. Master module 900 then reads 6 bytes of gyroscopic data in a step 1010 so that the data may be written to driver IC in a step 1015. OIS algorithm module 805 can then determine the appropriate amount of actuation to address the camera jitter in a step 1020. If the user has finished taking digital photographs as determined in a step 1025, the process ends at step 1030. Otherwise, steps 1010 through 1025 are repeated. The communication time for one cycle (steps 1010 through 1020) depends upon the bus clock period and the data width. If bus 845 can accommodate 3 bytes in each clock cycle of 10 µs, the cycle time is 10 µs*2*6*8+the algorithm calculation time for step 1020, which equals 0.96 ms+the algorithm calculation time.

Figure 11:
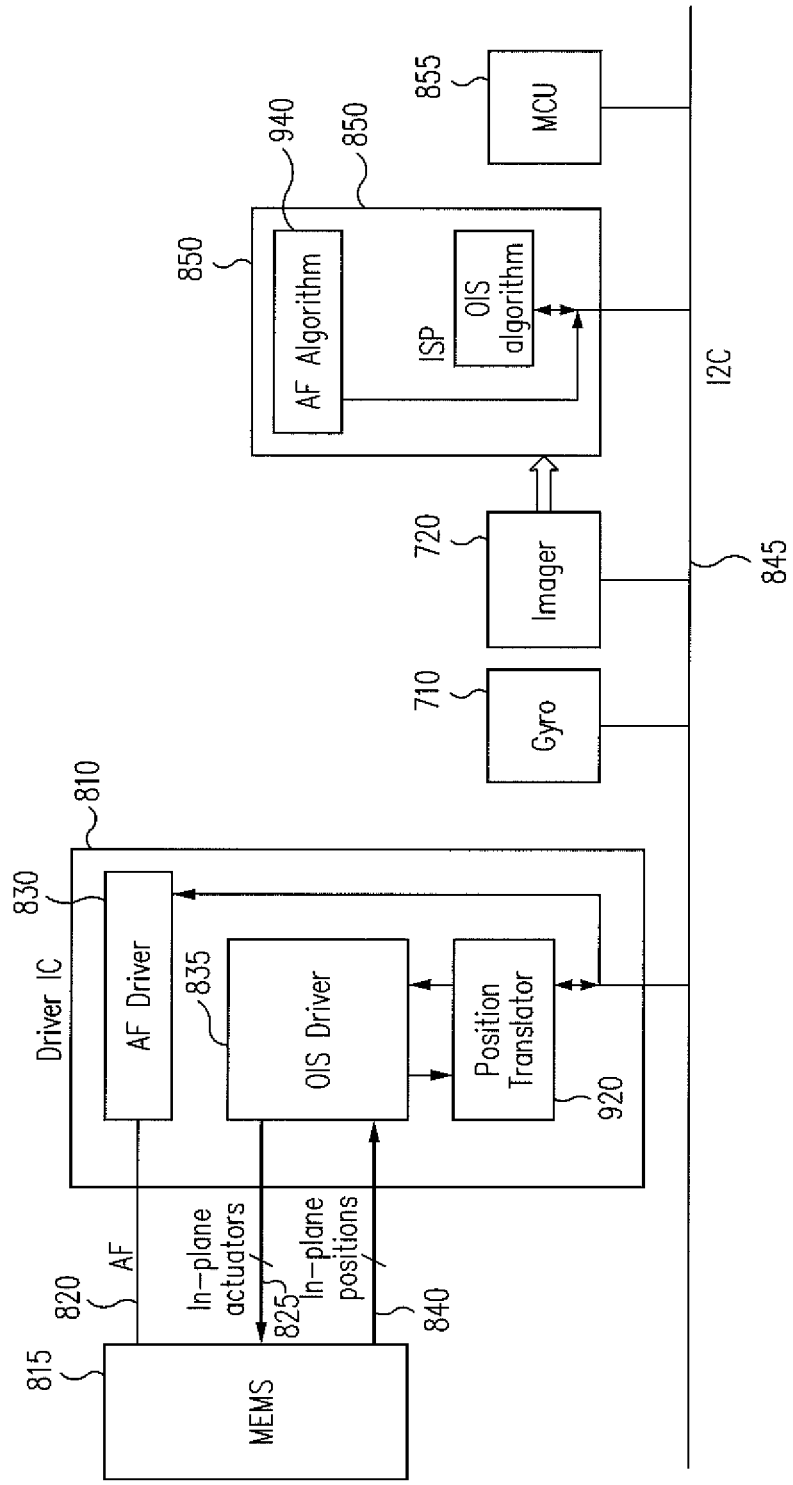
FIG. 11 is a block diagram of an embodiment of the system of FIG. 7 in which the optical image stabilization algorithm is implemented in an image processor integrated circuit.
Figure 12:
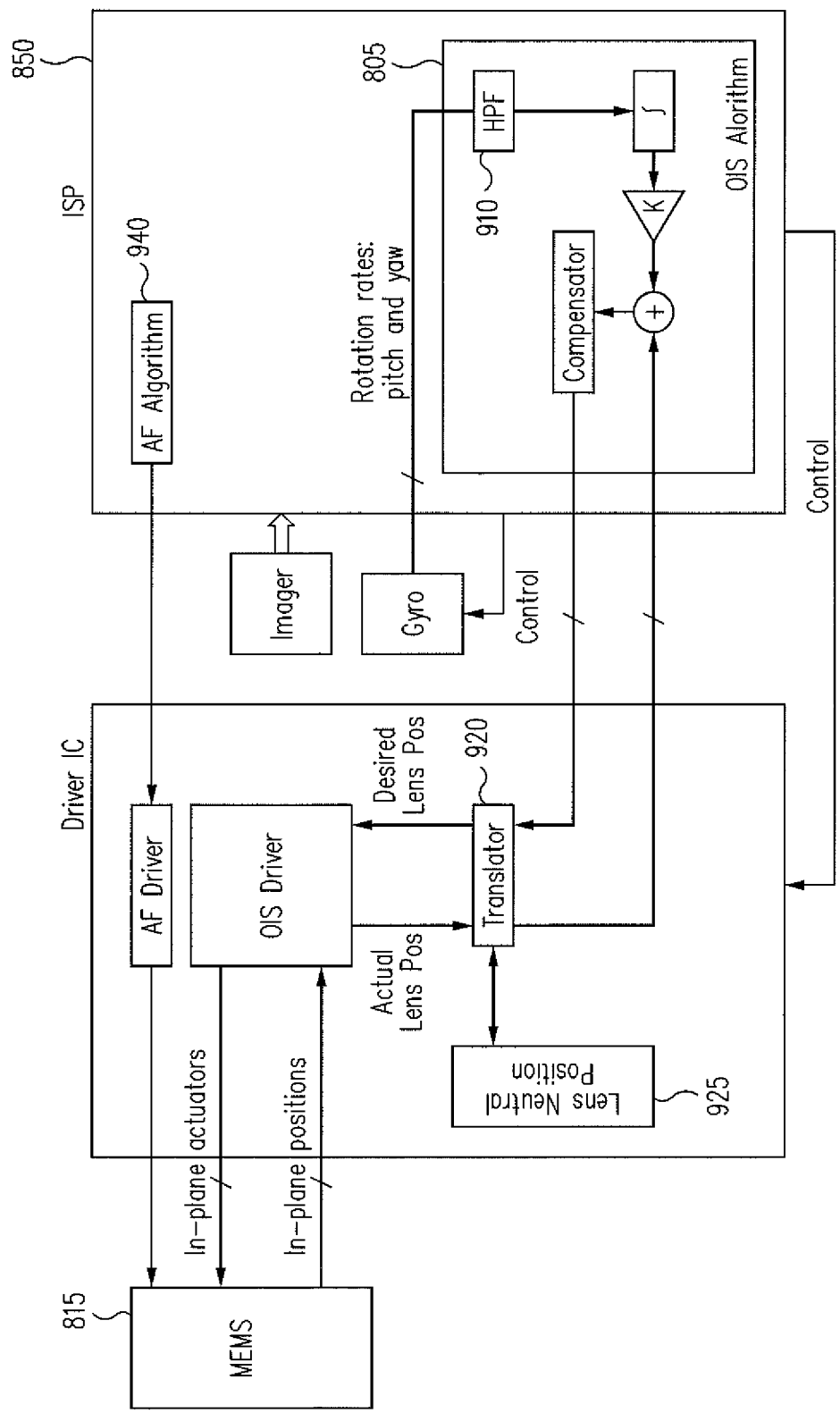
FIG. 12 illustrates more details for the driver and image processor integrated circuits of FIG. 11.

An alternative control architecture is shown in FIG. 11 in which OIS algorithm module 805 is located within ISP 850. Similar to FIG. 9, an autofocus algorithm module 940 in ISP 850 controls AF driver 830 in driver IC 810. Driver IC 810, gyroscope 710, imager 720, ISP 850 and MCU 855 all communicate using I²C bus 845. FIG. 12 shows the resulting control loops. OIS algorithm module 805 is again a simplified version in that the tracking filter is omitted and the intended motion of the camera approximated by high pass filtering 910 the pitch and yaw rates from gyroscope 710. ISP 850 controls both gyroscope 710 and driver IC 810. For illustration clarity, just a single combined channel is shown for OIS algorithm module 805.

Figure 13:
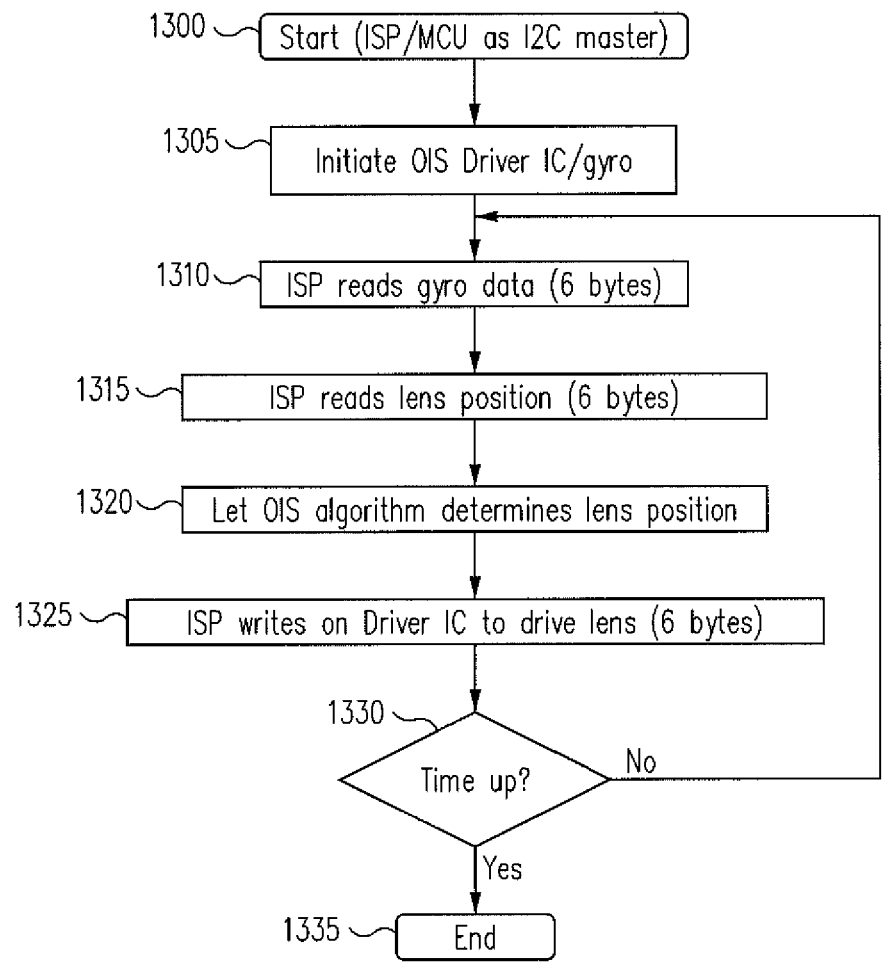
FIG. 13 is a flowchart for the image stabilization process performed by the system of FIGS. 11 and 12.

The resulting data traffic on bus 845 for the embodiment of FIGS. 11 and 12 is shown in FIG. 13. In response to invocation of an active picture taking mode, the OIS data traffic begins in an initial step 1300 with ISP 850 as the I²C bus master. Alternatively, MCU 855 may act as the master. Concurrent or subsequent to step 1300, gyroscope 710 may begin taking inertial measurements of camera movement and OIS driver 835 may command MEMS actuators 815 to transition from a parked to an active state as represented by step 1305. ISP 850 then reads 6 bytes of gyroscopic data in a step 1310. In addition, ISP 855 reads the current lens position as six bytes of data from translator 920 in a step 1315. OIS algorithm module 805 can then determine the appropriate amount of actuation to address the camera jitter in a step 1320 whereupon ISP 855 may write to driver IC accordingly with a six-byte actuation command in a step 1325. If the user has finished taking digital photographs as determined in a step 1330, the process ends at step 1335. Otherwise, steps 1310 through 1325 are repeated. The communication time for one cycle (steps 1310 through 1325 depends upon the bus clock period and the data width. If bus 845 can accommodate 3 bytes in each clock cycle of 10 µs, the cycle time is 10 µs*3*6*8+the algorithm calculation time for step 1320, which equals 1.44 ms+the algorithm calculation time. Thus, locating OIS algorithm module 805 in IC driver 810 as discussed previously is faster in a master-slave bus protocol system. In contrast, locating OIS algorithm 805 in ISP 850 requires an extra step of data movement.

As those of some skill in this art will by now appreciate and depending on the particular application at hand, many modifications, substitutions and variations can be made in and to the materials, apparatus, configurations and methods of use of the actuator devices of the present disclosure without departing from the spirit and scope thereof, and in light this, the scope of the present disclosure should not be limited to that of the particular embodiments illustrated and described herein, as they are merely by way of some examples thereof, but rather, should be fully commensurate with that of the claims appended hereafter and their functional equivalents.

What is claimed is:

1. A camera, comprising:
    a plurality of integrally formed electrostatic actuators, each actuator configured to exert a force on at least one lens, wherein each actuator comprises a fixed portion, a movable portion configured to move, relative to the fixed portion, between a first position, in which the actuator is operable, and a second position, in which the actuator is non-operable, and a latch configured to latch the movable portion in the first position;
    an optical image stabilization (OIS) algorithm module configured to command the plurality of actuators to actuate the at least one lens responsive to motion of the camera; and
    a driver integrated circuit operable to drive the actuators responsive to the OIS algorithm module's commands.

2. The camera of claim 1, wherein each actuator is configured to exert a tangential force on the at least one lens, and wherein the OIS algorithm module is configured to command the plurality of actuators to tangentially actuate the at least one lens responsive to the motion of the camera.

3. The camera of claim 2, further comprising:
    a plurality of position sensors corresponding to the plurality of actuators, each position sensor measuring a tangential displacement of its corresponding actuator; and
    a translator module operable to translate the tangential displacements from the position sensors into a displacement for the lens, wherein the OIS algorithm module is also responsive to the lens displacement.

4. The camera of claim 1,
    wherein the OIS algorithm module is integrated in the driver integrated circuit, wherein the OIS algorithm module is configured to command the driver integrated circuit to apply an acceleration pulse to the movable portion to latch the movable portion in the first position.

5. The camera of claim 1, further comprising:
    an imager configured to digitize an image taken through the at least one lens; and
    an image processor integrated circuit operable to process the digitized image, wherein the OIS algorithm module is integrated in the image processor integrated circuit.

6. The camera of claim 1, wherein the camera is integrated into a cellular telephone.

7. The camera of claim 6, wherein the actuators are electrostatic comb actuators.

8. The camera of claim 7, further comprising:
    a circular stage to receive the at least one lens, wherein the plurality of actuators comprises three actuators symmetrically disposed outside of the circular stage.

9. The camera of claim 1, wherein the OIS algorithm module includes a Kalman filter for predicting an intended motion of the camera.

10. The camera of claim 9, further comprising:
    a gyroscope, wherein the gyroscope measures a pitch and yaw of the camera, and wherein the Kalman filter predicts an intended motion of the camera based the measured pitch and yaw,
    wherein the OIS algorithm module is configured to command the plurality of actuators to actuate the at least one lens based on a difference between the intended motion of the camera predicted by the Kalman filter and an unintended jittering motion of the camera.

11. The camera of claim 1, wherein the OIS algorithm module commands the plurality of actuators based upon a relatively low data rate, and wherein the camera further includes at least one controller for controlling the actuators at a relatively high data rate based upon the OIS algorithm module commands.

12. A method of image stabilization, comprising:
    sensing a motion of a camera using a gyroscope;
    based upon the sensed motion, determining a desired lens actuation that stabilizes a camera lens;
    translating the desired lens actuation into desired tangential actuations;
    tangentially actuating the lens using a plurality of tangential actuators according to the desired tangential actuations;
    moving a movable portion of each of the plurality of tangential actuators to be latched at a first position, in which the tangential actuator is operable to actuate the lens, before tangentially actuating the lens;
    filtering sensed camera motion from the gyroscope to provide a prediction of an intended position for the lens;
    sensing tangential actuations by the plurality of tangential actuations;
    translating the tangential actuations into a current lens position; and
    subtracting the current lens position from the intended lens position to provide a lens position error due to unintended camera motion, wherein the desired lens actuation stabilizes the lens by addressing the unintended camera motion.

13. The method of claim 12, wherein the filtering is a Kalman filtering.

14. The method of claim 12, wherein the filtering is a high pass filtering.

15. The method of claim 12, wherein the tangential actuation is a MEMS electrostatic comb tangential actuation, and wherein the movable portion of each of the plurality of tangential actuators is moved to the first position by applying an accelerating pulse to the movable portion to cause a lever of the movable portion to engage a latch.

16. A system, comprising:
    a lens;
    a stage holding the lens within a curved aperture;
    three integrally formed tangential actuators symmetrically disposed about the stage, each tangential actuator operable to displace the stage in a direction tangential to a curve defined by the curved aperture, wherein each tangential actuator comprises a fixed portion, a movable portion configured to move, relative to the fixed portion, between a first position, in which the tangential actuator is operable, and a second position, in which the tangential actuator is not operable, and a latch configured to latch the movable portion in the first position;

an optical image stabilization (OIS) algorithm module operable to derive an actuation command for each of the three tangential actuators responsive to motion of the camera; and a driver integrated circuit operable to drive the actuators responsive to the OIS algorithm module's commands.

17. The system of claim 16, wherein the curved aperture is a circle and the curve defined by curved aperture is a circle.

18. The system of claim 16, further comprising three V-shaped flexures corresponding to the three tangential actuators, wherein each tangential actuator couples to the stage through the corresponding V-shaped flexure.

19. The system of claim 18, wherein each V-shaped flexure has a longitudinal axis aligned in the direction tangential to the curve.

* * * * *